United States Patent Office 3,549,388
Patented Dec. 22, 1970

3,549,388
PROCESS FOR THE PASTEURIZATION OF EGG PRODUCTS AND PRODUCTS SO PREPARED
Willibald F. Kohl, Nanuet, N.Y., and Arthur D. F. Toy, Stamford, Conn., assignors to Stauffer Chemical Company, New York, N.Y., a corporation of Delaware
No Drawing. Continuation-in-part of application Ser. No. 738,411, June 20, 1968. This application Dec. 30, 1968, Ser. No. 788,078
Int. Cl. A23b 5/00
U.S. Cl. 99—161
20 Claims

ABSTRACT OF THE DISCLOSURE

A process of pasteurizing egg products which comprises the addition of a responsive amount of a peroxyhydrate of an alkali metal salt of a phosphate, sulfate or carbonate thereto. The egg products are then heated to pasteurization temperatures.

CROSS-REFERENCE TO RELATED APPLICATION

This application is a continuation-in-part of application Ser. No. 738,411, filed June 20, 1968, now abandoned, for "Improved Process for the Pasteurization of Egg Products."

BACKGROUND OF THE INVENTION

There are a number of food poisoning microorganisms that cause serious problems in the food industry. Among these different spoilage organisms which may contaminate foodstuff, the group Salmonellae has gained special importance. Salmonellae are pathogenic gram-negative rod-like bacteria that have drawn much recent attention that is well documented in the literature. Of the several food areas involved, particular interest has been generated in the reduction of Salmonellae in egg products. The contents of an egg with unbroken shell may already contain bacteria caused by the infection of a laying hen. The exterior surface of the egg may be contaminated with bacteria from the intestinal tract of the hen, from the nest or from other material contacted after laying. Some of these can be introduced into egg products during breaking operations. Bacteria can also penetrate the shell from outside. The invading microorganisms infect the egg and can be carried on into a variety of egg products.

The elimination of Salmonellae by pasteurization of egg products has become mandatory under United States Department of Agriculture regulations. According to these regulations all egg products have to be pasteurized regardless of whether they are to be distributed in frozen, liquid or dried form.

There are problems in pasteurization that are peculiar to egg whites as compared to whole eggs or yolks. All pasteurization processes for egg whites must be a compromise between the amount of heat applied to kill Salmonellae and the coagulation of the egg proteins, which effect the functional properties thereof. Although naturally occurring levels of Salmonellae are seldom greater than 100 per milliliter of egg product, present processes have need of improvement to minimize undesirable effects on functional properties or excessive buildup on plant equipment. Present processes also lack retained inhibitory effects after pasteurization.

At present, there exist several processes which give acceptable destruction of Salmonellae in egg products. One of these processes is described and claimed in U.S. Pat. No. 3,251,697, which involves the addition of a food grade acid to lower the pH of the egg whites from about 9.0 to about 7.0, and with the addition of aluminum or other metal ions to stabilize the egg proteins against coagulation at higher temperatures. These materials may be added to give a concentration of 30 parts per million as aluminum, added in the form of aluminum sulfate and 0.15% lactic acid in the egg whites. The egg whites may then be pasteurized at a temperature of 140 to 143° F., at a holding time of 3.5 minutes. This procedure is reported to destroy one million added Salmonellae per milliliter. However, it has been found in practice that the bacterial count in this process is relatively high after treatment. Also, the aluminum sulfate in the egg whites will cause the appearance of small particles of precipitated egg proteins.

Another proposed solution to killing the bacteria within the egg whites is described and claimed in U.S. Pat. No. 2,776,214. This process involves taking the egg white at its normal pH, heating it to 100° to 130° F. for a period of 0.5 to 5 minutes. This is claimed to largely inactivate the indigenous catalase. Thereafter, sufficient hydrogen peroxide solution is metered in to give a concentration of 0.1% peroxide in the egg whites. The egg whites are then reheated and they are cooled and catalase is added to destroy the residual peroxide. This process is reported to produce substantially sterile egg white. This process has a serious drawback because a relatively high amount of bacteria may survive the pasteurization process when heat resistant bacteria strains are present in the egg whites.

BRIEF DESCRIPTION OF THE INVENTION

It has been discovered that the number of Salmonellae bacteria killed during pasteurization thereof can be materially increased by incorporating within the egg products peroxyhydrates of alkali metal salts of phosphates, sulfates and carbonates. The amount of the peroxyhydrate of an alkali metal salt added thereto may range between 0.05 and 5% by weight of the egg products which will effectively raise the pH of the egg products to at least from 0.1 to about 3 units above their natural pH. The egg products are then pasteurized at a temperature ranging between 115° and 145° F. It has been found that with the use of the peroxyhydrates of alkali metal salts the kill of Salmonellae bacteria is materially increased and also provides for residual killing thereof which is heretofore unknown.

DETAILED DESCRIPTION OF THE INVENTION

In the practice of the present invention, egg products are obtained in a conventional manner. As is well known, the pH of the egg whites is approximately 9.0. The egg products are treated with peroxyhydrates of alkali metal salts. The amount of additives may range between 0.05 and 5% by weight of the egg products. This addition of peroxyhydrates of alkali metal salts will effectively raise the pH to from about 0.1 to about 3 units above the natural pH thereof. The egg products are then heated to a pasteurization temperature of from about 115 to 145° F. for from 0.5 to 5 minutes.

The peroxyhydrates of alkali metal salts employed with the present invention may be selected from the group of peroxyhydrates of tetrasodium pyrophosphate, trisodium orthophosphate, sodium tripolyphosphate, disodium orthophosphate, tripotassium orthophosphate, dipotassium orthophosphate, potassium tripolyphosphate, tetrapotassium pyrophosphate, sodium sulfate, potassium sulfate, sodium carbonate, potassium carbonate, and mixtures thereof. Specific examples of peroxyhydrates of alkali metal salts are $KH_2PO_4 \cdot 0.5\text{-}2H_2O_2$, $Na_2HPO_4 \cdot 0.5\text{-}5H_2O_2$
$K_2HPO_4 \cdot 1\text{-}4H_2O_2$, $Na_3PO_4 \cdot 0.5\text{-}6H_2O_2$
$Na_4P_2O_7 \cdot 0.5\text{-}8H_2O_2$, $K_4P_2O_7 \cdot 1\text{-}10H_2O_2$ $Na_5P_3O_{10} \cdot 1\text{-}4H_2O_2 \cdot 1\text{-}3H_2O$, $Na_2SO_4 \cdot H_2O \cdot 0.5\text{-}2H_2O_2$
$K_2SO_4 \cdot H_2O \cdot 0.5\text{-}2H_2O_2$, $Na_2CO_3 \cdot 0.5\text{-}5H_2O_2$
and
$K_2CO_3 \cdot 0.5\text{-}5H_2O_2$ The peroxyhydrates of alkali metal salts as noted above raise the pH of the egg products. It has been found that the power of the additives to kill Salmonellae along with the heat of pasteurization materially increases and reaches heretofore unknown levels. Also, the presence of the alkali material within the egg products provides residual killing power of Salmonellae after the eggs have been cooled and the pH thereof readjusted to the natural level.

The term "egg products" as used in the above description is intended to include the treatment of egg whites or liquid whole eggs. When pasteurizing egg whites, it may be desirable to first heat the egg whites to temperatures of about 120 to 140° F. preferably about 130° F., for from 0.5 to 5 minutes. This preheating step would necessarily kill the natural catalase prior to the addition of the peroxyhydrate of an alkali metal salt. Then, the natural catalase may be added after the egg whites have been pasteurized and cooled, along with readjusting the pH. Also, it has been found that a bivalent metal ion material may be added to liquid whole eggs prior to the pasteurization of the liquid whole eggs. This can be brought about by adding from about 0.075 to about 0.75% by weight of a bivalent metal ion material selected from the group consisting of calcium and zinc and mixtures thereof, along with peroxyhydrates of alkali metal salts. The addition of a bivalent metal material functions to preserve the functional properties of the liquid whole eggs. The presence of the bivalent metal ion material retains the color of the liquid whole egg upon storage. The bivalent metal ion material can be added in the form of salts such as zinc chloride, calcium hydroxide, calcium chloride, calcium acetate and mixtures thereof.

In order to illustrate the merits of the invention, the following examples are provided:

EXAMPLE 1

Fresh egg whites were obtained in a hand operation by separating the same from the yolks and mixed to form a uniform batch. The natural pH of the egg whites was determined to be 8.7. A bacterial culture of Salmonellae Senftenberg 775W was added to the egg whites to provide a concentration thereof of 32,000,000 per milliliter. These egg whites were preheated to 130° F., for 1.5 minutes to destroy the natural catalase in the egg whites. Thereafter, an amount of 0.75% by weight of the peroxyhydrate of tetrasodium pyrophosphate 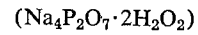 was added to the egg whites and dissolved therein. The addition of this compound raised the pH of the egg whites to 8.9. The egg whites were then pasteurized at 130° F. for 3.5 minutes. After this heat treatment the egg whites were cooled rapidly to 40° F. Samples were drawn for microbiological examination which indicated that the samples were Salmonellae negative.

EXAMPLE 2

The procedure as set forth in Example 1 was repeated in its entirety, except 0.2% by weight hydrogen peroxide was added to the egg whites instead of the peroxyhydrate of tetrasodium pyrophosphate $(Na_4P_2O_7 \cdot 2H_2O_2)$. An assay of the pasteurized egg whites using standard microbiological procedures indicated the survival of 210 Salmonellae per milliliter.

EXAMPLE 3

The procedure as outlined in Example 1 was repeated in its entirety except no additives were incorporated within the egg whites. A concentration of 6.1 million Salmonellae per milliliter was found to survive the pasteurization using standard microbiological testing methods.

EXAMPLE 4

Fresh eggs were separated from the shell in a hand operation and mixed together to form a uniform batch. A bacterial culture of Salmonellae Senftenberg 775W was added to the liquid whole eggs to provide a concentration thereof at $2.9 \times 10^7$ per milliliter. Then the peroxyhydrate of tetrasodium pyrophosphate $$(Na_4P_2O_7 \cdot 2H_2O_2)$$

was dissolved in the liquid whole eggs to provide a concentration thereof of 1.5% by weight of the liquid whole eggs. The pH of the liquid whole eggs was then measured and determined to be 8.1. The liquid whole eggs were then pasteurized at a temperature of 130° F. for a holding time of 5 minutes and then quickly cooled. An assay of the liquid whole eggs using standard biological procedures indicated the sample to be Salmonellae negative.

EXAMPLE 5

The procedure as set forth in Example 4 was repeated in its entirety except 1.1% of the peroxyhydrate of tetrasodium pyrophosphate was dissolved within the liquid whole eggs without any hydrogen peroxide therein. An assay of the pasteurized liquid whole eggs using standard biological procedures indicated a survival of $1.3 \times 10^4$ Salmonellae per milliliter.

EXAMPLE 6

The procedure as set forth in Example 4 was repeated in its entirety except 0.4% hydrogen peroxide was added to the liquid whole eggs without the peroxyhydrate of tetrasodium pyrophosphate. The pH thereof was determined to be 7.1. An assay of the pasteurized liquid whole eggs using standard biological procedures indicated a survival of $2.2 \times 10^3$ Salmonellae per milliliter.

EXAMPLE 7

The procedure as set forth in Example 4 was repeated in its entirety except no additives were dissolved within the eggs. The pH of the liquid whole eggs were determined to be 7.1. An assay of the pasteurized liquid whole eggs using standard biological procedures indicated a survival of $1.2 \times 10^6$ Salmonellae per milliliter.

EXAMPLE 8

The functional properties of the additives of the present invention were studied by incorporating 5 grams of the peroxyhydrate of tetrasodium pyrophosphate

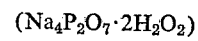

in 1000 grams of egg whites. The egg whites were then pasteurized at 130° F. for five minutes holding time. The pasteurized egg whites were used to bake angel food cakes according to standard procedures. Another angel food cake was baked in accordance with standard procedures with the egg whites being pasteurized at 130° F. for five minutes holding time but having no additives incorporated therein. The cakes baked with the egg whites pasteurized with the additives of the present invention therein had a higher specific volume than the cakes baked with the egg whites pasteurized without additives.

EXAMPLE 9

The procedure as set forth in Example 8 was repeated in its entirety except 1% by weight of the peroxyhydrate of trisodium phosphate was used in lieu of the peroxyhydrate of tetrasodium pyrophosphate. Also, the eggs were pasteurized at a temperature of 135° F. for 3.5 minutes holding time. The results obtained paralleled the results obtained in Example 8.

EXAMPLE 10

The functional properties of the additives of the present invention were evaluated by obtaining 1000 grams of liquid whole eggs. Then, 5 grams of calcium chloride was dissolved therein followed by 5 grams of the peroxyhydrate of tetrasodium pyrophosphate ($Na_4P_2O_7 \cdot 2H_2O_2$). The batch of liquid whole eggs were then pasteurized at 130° F. for five minutes holding time. Sponge cakes were made in accordance with standardized procedures with the pasteurized whole eggs. A second batch of sponge cakes were manufactured with pasteurized whole eggs but without additives. The cakes baked with the eggs which did not have additivies incorporated therein were lumpy and had a tendency to crumble. The cakes baked with the eggs having additives incorporated therein were very light and had good shape retention.

EXAMPLE 11

Fresh egg whites were obtained in a hand operation by separating the same from the yolks. The eggs whites were mixed to form a uniform batch. The pH of the egg whites was determined to be 9.0. A bacterial culture of Salmonella Seuftenberg 775W was added to the egg whites to provide a concentration thereof of 1,330,000 per ml. of egg whites. These egg whites were heated in a pasteurization apparatus and were held at 130° F., for 1.5 minutes. This treatment was intended to destroy the catalase present in egg whites. Thereafter, amounts of 0.5%, 1%, 1.5%, or 2% of the peroxyhydrate of sodium sulfate, with the approximate formula $Na_2SO_4 \cdot H_2O \cdot \frac{1}{2} H_2O_2$ were added to portions of egg whites, and dissolved therein. The addition of this compound did not create any noticeable change of pH of the egg whites. The egg whites were then pasteurized at 130° F. for 3.5 minutes holding time.

After this heat treatment, the egg whites were cooled rapidly to a temperature under 50° F. Samples of egg whites were drawn for microbiological examinations which indicated that all the egg whites pasteurized with the addition of the noted amounts of the peroxyhydrate of sodium sulfate were Salmonella negative.

EXAMPLE 12

The procedure as set forth in Example 11 was repeated in its entirety, except amounts of 0.4%, 0.6% or 0.8% of the peroxyhydrate of sodium carbonate with the approximate formula $Na_2CO_3 \cdot 1\frac{1}{2} H_2O_2$ were added to the egg whites instead of the peroxyhydrate of sodium sulfate. The addition of the noted amounts of the peroxyhydrate of sodium carbonate raised the pH of the egg whites to 9.3, 9.5 and 9.75 respectively.

Assays of the pasteurized egg whites using standard microbiological procedures indicated all samples to be Salmonella negative. The initial concentration of Salmonella Seuftenberg 775W in the egg whites before pasteurization in this example has been 1,030,000 per ml.

EXAMPLE 13

The effects of the additives of the present invention upon the functional properties of the egg whites were tested. Egg whites were preheated to 130° F. for 1.5 minutes. Then amounts of 5, 10, 15 or 20 grams of the peroxyhydrate of sodium sulfate (approximate formula $$Na_2SO_4 \cdot H_2O \cdot \tfrac{1}{2} H_2O_2)$$

were added to portions of 1000 grams of egg whites and dissolved therein.

The egg whites were then pasteurized at 130° F. for 3.5 more minutes holding time. The pasteurized egg whites were tested for their whipping properties, and were used to bake angel food cakes according to standard procedures. Egg whites which were pasteurized for the same time as above at 130° F. but had no chemical additives added served as controls for the whipping tests and the baking performance tested with angel food cakes. The cakes baked with the egg whites pasteurized with the additives of the present invention therein had the same volumes and specific volumes than the cakes baked with the egg whites pasteurized without additives. Also, the whipping properties as expressed by the volumes of the foam of egg whites after a standardized whipping procedure were the same for egg whites pasteurized with the peroxyhydrate of sodium sulfate and egg whites pasteurized without additives.

EXAMPLE 14

The procedure as set forth in Example 13 was repeated in its entirety except an amount of 4 grams of the peroxyhydrate of sodium carbonate (approximate formula $$Na_2CO_3 \cdot 1\tfrac{1}{2} H_2O_2)$$

was added to 1000 grams of egg whites and dissolved therein. Also, the egg whites were pasteurized at 130° F., and tested as described in Example 13. The results obtained paralleled the results obtained in Example 13. However, it was found to be necessary to re-adjust the pH of the egg whites after pasteurization with a food grade acid to 9.0 which is the pH of fresh egg whites in order to avoid changes in the cell structure and crumb of the cakes.

What is claimed is:

1. A process of pasteurizing egg products, comprising the steps of:
   (a) adding a responsive amount of a peroxyhydrate of an alkali metal salt thereto; and,
   (b) heating said egg products to a pasteurization temperature for a sufficient length of time to pasteurize them.

2. The process as set forth in claim 1, wherein the pH of the egg products will be from 0.1 to 3 units above the natural pH.

3. The process as set forth in claim 1, wherein the amount of peroxyhydrate of an alkali metal salt added is between 0.05 and 5% by weight.

4. The process as set forth in claim 1, wherein said peroxyhydrate of an alkali metal salt is selected from the group consisting of the peroxyhydrates of tetrasodium pyrophosphate, trisodium orthophosphate, sodium tripolyphosphate, disodium orthophosphate, tripotassium orthophosphate, dipotassium orthophosphate, potassium tripolyphosphate, tetrapotassium pyrophosphate, sodium sulfate, potassium sulfate, sodium carbonate, potassium carbonate, and mixtures thereof.

5. The process as set forth in claim 1, wherein said egg products are egg whites.

6. The process as set forth in claim 5, with the additional step of preheating said egg whites to kill the natural catalase.

7. The process as set forth in claim 6, wherein said preheated temperature ranges between 120 and 140° F.

8. The process as set forth in claim 6, wherein said preheating ranges between about 0.5 and 5 minutes.

9. The process as set forth in claim 6, wherein said preheating temperature ranges between 120 and 140° F. for from about 0.5 to about 5 minutes.

10. The process as set forth in claim 6, together with the additional step of cooling said egg white and adding natural catalase.

11. The process as set forth in claim 10, together with the additional step of adjusting the pH back to its natural level.

12. The process as set forth in claim 1, wherein said egg products are liquid whole eggs.

13. The process as set forth in claim 12, together with the additional step of adding to the liquid whole eggs a food grade bivalent metal ion material.

14. The process as set forth in claim 13, wherein said bivalent metal ion material is present in an amount ranging between 0.075 and 0.75% by weight.

15. The process as set forth in claim 13, wherein said bivalent metal ion material is selected from the group consisting of: zinc chloride, calcium hydroxide, calcium chloride, calcium acetate, and mixtures thereof.

16. The process as set forth in claim 1, wherein said pasteurization temperature ranges between 115 and 145° F.

17. The process as set forth in claim 1, wherein said pasteurization temperature is held between 0.5 and 5 minutes.

18. The process as set forth in claim 1, wherein said pasteurization temperature ranges between 115 and 145° F. for from 0.5 to 5 minutes.

19. The process as set forth in claim 1, together with the additional steps of cooling said egg products and adjusting the pH to its natural level.

20. The pasteurized egg products resulting from the process of claim 1.

References Cited

UNITED STATES PATENTS

| 2,758,933 | 8/1956 | Shaffer | 99—161X |
| 2,776,214 | 1/1957 | Lloyd et al. | 99—161X |
| 3,328,175 | 6/1967 | Cunningham et al. | 99—161 |
| 3,364,037 | 1/1968 | Mink et al. | 99—161 |

OTHER REFERENCES

Encylopedia of Chemistry, 2nd ed., April 1966, pp. 792, 793.

TIM R. MILES, Primary Examiner

U.S. Cl. X.R

99—211